I. Dreyfus,

Lubricator.

No. 106,261. Patented Aug. 9, 1870.

Isidore Dreyfus
by A. Pollok
his atty.

WITNESSES.

UNITED STATES PATENT OFFICE.

ISIDORE DREYFUS, OF NEW YORK, N. Y.

IMPROVEMENT IN LUBRICATORS.

Specification forming part of Letters Patent No. 106,261, dated August 9, 1870.

*To whom it may concern:*

Be it known that I, ISIDORE DREYFUS, of the city, county, and State of New York, have invented certain new and useful Improvements in Lubricators; and I hereby declare the following to be a full, clear, and exact description of the same, reference being had to the accompanying drawing, in which—

Figure 1:
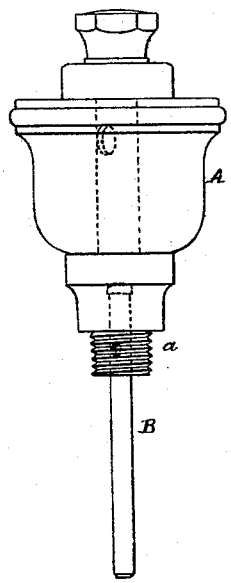
Figure 2:
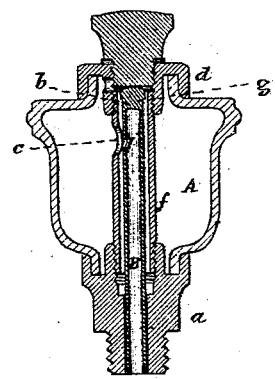

Figure 1 is a side elevation of a lubricator made in accordance with my invention. Fig. 2 is a vertical central section of the same.

My invention relates to that class of lubricators in which the oil vessel or reservoir is provided with a loose or sliding spindle or rod, by means of which the oil is conducted from the reservoir to the part requiring lubrication.

The lubricator I have devised is intended to be applied to and to move with any oscillating, vibratory, or rotating part—as, for instance, a loose pulley—in such manner that during its rotating or oscillatory movement it may deliver the oil regularly and with certainty, and distribute it evenly upon the journal or other part to be lubricated.

To this end the nature of my invention consists in combining, with an oil cup or reservoir of any suitable construction, a tube or hollow spindle, having its end within the reservoir closed, and preferably weighted, and provided with a suitable aperture for the entrance of the oil, and arranged so as to slide in and out of the reservoir, according to the varying positions of the lubricator during the movement of the loose pulley or other part to which it is attached.

These and other features of my invention will be more fully understood by reference to the accompanying drawing, in which A represents the oil-vessel, and B the spindle or tube.

The reservoir may be made of glass, metal, or other material, and may be of any suitable form or construction. That end, *a*, of it which is screwed into the hub of the loose pulley or other part is cored, so as to form a socket or bearing, in which the sliding spindle will fit snugly. The lubricator is, of course, screwed to the hub, so as to allow a certain play to the spindle to and from the journal or other part to be lubricated.

The end of the hollow spindle within the oil-reservoir is closed, as shown at *b*; and there is also an aperture, *c*, in the tube to admit of the entrance of oil from the reservoir.

In the drawing I have represented a glass reservoir, provided with metallic caps *a d*, closing its top and bottom, said caps being held together by means of a tubular stem, *f*, which encircles the spindles when the latter drop back in the reservoir, and which is screwed into both caps, as shown.

By turning or screwing down the upper cap the parts are all drawn tightly and firmly together. A screw-plug in the upper cap is provided to allow the reservoir to be supplied with oil whenever necessary.

In the tubular stem apertures are formed at its top or bottom to allow the oil to pass freely to the interior of the spindle, whether the lubricator be turned up or down.

It will be understood, however, that the use of the above-described parts is not essential to the operation of the spindle, for, as I have before stated, the spindle may be used with any lubricator of suitable construction.

It will also be understood that the spindle is rarely, if ever, in practice, required to project its full length from the reservoir. To provide, however, for such an emergency, I form a shoulder, *g*, on the upper end of the spindle, which will prevent it from dropping entirely away from the reservoir.

The operation is as follows: Suppose the lubricator, properly supplied with oil, to be screwed upon the hub of a loose pulley, so that its spindle may have a play more or less limited to and from the journal or shaft upon which the pulley is mounted, and suppose the lubricator to be in an upright position, so that its spindle, filled with oil, will drop until it comes in contact with the journal; then, if the pulley be rotated, the end of the hollow spindle will remain in contact with the shaft until the lubricator, in its rotary movement around the axis, is turned below the horizontal plane. As the oil-cup is then reversing its position, or turning upside down, the spindle is also correspondingly reversed, and drops back suddenly into the reservoir. By reason of its closed end, or both weighted and closed end, it will cause a sudden displacement of the oil, or both oil and air, in the reservoir, and, this action being communicated to the liquid in the hollow spindle, will cause a certain quantity to be ejected with some force from the open end of the spindle, and against the shaft around which the lubricator and its pulley revolve. When the lubricator, continuing its rotation, rises above the horizontal plane, the spindle, still filled with oil, will drop out from the lubricator, and again be brought and remain in contact with the shaft until the lubricator passes again below the horizontal plane, when it will, as before, fall back into the reservoir, and cause oil to be ejected from the lubricator upon the shaft. Thus, during the rotation of the lubricator, there is a continuous reciprocating sliding motion or pumping action of the spindle, and the shaft is lubricated regularly and evenly at every point.

It will be understood, without further explanation, that, although I have described the application of the lubricator to a loose pulley or other revolving part, the same can be equally well applied to any portion of machinery having a vibratory or oscillating motion.

Having now described my invention, what I claim, and desire to secure by Letters Patent, is—

1. A lubricator in which the oil reservoir or vessel is combined with a sliding tube or hollow spindle, closed at one end, and provided with suitable apertures for admission and discharge of oil, the same being applied and operating substantially as shown and set forth.

2. The employment, in a lubricator for machinery, and in combination with the oil-reservoir, of the sliding discharge tube or spindle, having its end within the reservoir closed and weighted, as shown and set forth.

3. The combination of the body of the reservoir, the caps closing the top and bottom of the same, the perforated tubular stem connecting said caps, and the sliding hollow spindle or tube, under the arrangement and for operation as set forth.

In testimony whereof I have signed my name to this specification before two subscribing witnesses.

ISIDORE DREYFUS.

Witnesses:
   A. POLLOK,
   M. BAILEY.